US008923456B2

(12) United States Patent  (10) Patent No.: US 8,923,456 B2
Nie et al.  (45) Date of Patent: Dec. 30, 2014

(54) METHOD AND SYSTEM FOR CHANNEL ESTIMATION (75) Inventors: Yuanfei Nie, Shanghai (CN); Gang Hu, Shanghai (CN); Meiwu Wu, Shanghai (CN)

(73) Assignee: Montage Technology (Shanghai) Co., Ltd., Shanghai (CN)

( * ) Notice: Subject to any disclaimer, the term of this patent is extended or adjusted under 35 U.S.C. 154(b) by 65 days.

(21) Appl. No.: 13/819,276

(22) PCT Filed: Mar. 17, 2011

(86) PCT No.: PCT/CN2011/071916
§ 371 (c)(1),
(2), (4) Date: Feb. 26, 2013

(87) PCT Pub. No.: WO2012/071832
PCT Pub. Date: Jun. 7, 2012

(65) Prior Publication Data
US 2013/0156138 A1 Jun. 20, 2013

(30) Foreign Application Priority Data
Nov. 30, 2010 (CN) .......................... 2010 1 0565349

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)
*H04L 25/02* (2006.01)

(52) U.S. Cl.
CPC ............ *H04B 1/1081* (2013.01); *H04L 25/022* (2013.01); *H04L 25/0228* (2013.01)

USPC ........... 375/346; 375/260; 375/349; 375/343; 370/332; 370/333; 370/334; 455/452.2; 455/501; 455/63.1

(58) Field of Classification Search
CPC .............. H04L 27/2647; H04L 5/0007; H04L 27/2657; H04L 27/2662; H04L 5/0048; H04L 7/042; H04L 1/20; H04L 1/06; H04L 25/0204; H04L 1/0002; H04L 1/0003; H04B 1/7093; H04B 1/707; H04B 1/709; H04B 1/1027; H04B 1/123; H04B 1/1036; H04B 7/002; H04B 1/109; H04B 7/0617; H04B 15/00; H04B 17/0057; H04B 1/525; H04B 17/0042; H04B 17/001; H04B 17/0062; H04W 36/30; H04W 36/18; H04W 24/00; H04W 48/16; H04W 36/14; H04W 28/04; H04W 28/22; H04W 52/12; H04W 16/28; H04W 52/42; H04W 28/18; H04W 28/14; H04W 72/085; H04W 16/14; H04W 72/082; H04W 52/24; H04W 52/20
USPC .......... 375/346, 260, 349, 343; 370/332, 333, 370/334; 455/452.2, 501, 63.1, 67.15, 69
See application file for complete search history.

(56) References Cited

U.S. PATENT DOCUMENTS

| 7,339,999 B2 * | 3/2008 | Gore et al. ..................... 375/260 |
| 7,630,450 B2 * | 12/2009 | Duncan ......................... 375/260 |
| 8,335,270 B2 * | 12/2012 | Hua et al. ....................... 375/260 |
| 2004/0203442 A1 * | 10/2004 | Krishnan et al. ............ 455/67.11 |
| 2008/0198942 A1 | 8/2008 | Akella et al. |
| 2010/0002788 A1 * | 1/2010 | Wu et al. ....................... 375/260 |
| 2010/0202544 A1 * | 8/2010 | Osseirar et al. ............... 375/260 |
| 2011/0103500 A1 * | 5/2011 | Vetterli et al. ................ 375/260 |

FOREIGN PATENT DOCUMENTS

| CN | 1620052 A | 5/2005 |
| CN | 101815043 A | 8/2010 |
| WO | WO 2010/081896 A2 | 7/2010 |

OTHER PUBLICATIONS

International Search Report issued in Application No. PCT/CN2011/071916; dated Sep. 8, 2011.

* cited by examiner

*Primary Examiner* — Phuong Phu
(74) *Attorney, Agent, or Firm* — Oliff PLC (57) ABSTRACT

The present invention relates to a method and system for channel estimation. First, pilot signals are extracted from a received multi-path signal, in which each pilot signal includes a first pilot and a second pilot. Then, an initially estimated channel frequency-domain response is obtained based on the extracted first pilot. Afterward, a frequency-domain response estimate of each pilot frequency in the second pilot is calculated according to the obtained initially estimated channel frequency-domain response, an actual value of each pilot frequency in the second pilot is obtained based on the extracted second pilot, and a deviation between the frequency-domain response estimate and the actual value of each pilot frequency is calculated. When it is detected that aliasing components exist in the initially estimated channel frequency-domain response, a center of each aliasing component is determined according to the deviation, so as to determine an estimated position of each aliasing component. Finally, the initially estimated channel frequency-domain response is corrected according to the estimated positions of the aliasing components, so as to obtain an accurate channel estimation response.

22 Claims, 5 Drawing Sheets

METHOD AND SYSTEM FOR CHANNEL ESTIMATION

BACKGROUND OF THE PRESENT INVENTION

1. Field of Invention

The present invention relates to a method and system for channel estimation, and specifically to a method and system for channel estimation involving signals from an ultra-long path.

2. Description of Related Arts

In an existing communication system, a sending end may send signals to a receiving end through different transmission paths (that is, channels). Therefore, the receiving end needs to perform ultra-long path detection to obtain accurate channel estimation. Currently, two methods exist for ultra-long path detection.

1. Judging whether an ultra-long path exists by observing a correlation sum for a long period of time using a correlation between cyclic prefixes and Orthogonal Frequency Division Multiplex (OFDM) symbols. Though having high reliability, this method can only determine an approximate position of the ultra-long path, and offers poor noise cancellation performance for channel estimation.

2. Performing blind estimation with a second-order matrix using all data and pilots in a frequency domain. This method has a disadvantage of high complexity. For more details, reference may be made to paper: Husen, S. A, Beggen S., Filippi A. et al, blind estimation of maximum delay spread in OFDM systems, vtc-2006 fall.

US Patent Application No. US20080198942 describes that when the channel length is greater than the number of pilots multiplied by the symbol rate, a window is placed to eliminate multi-path aliasing interference. The principle is described as follows.

A model based on discrete channels is:

$$h = \sum_i a_i \delta(i - \tau_i),$$

where $a_i$ and $\tau_i$ are a response and a delay corresponding to the $i^{th}$ transmission path respectively, and the corresponding frequency-domain response is:

$$H_k = \sum_i a_i \cdot \exp(-j2\pi k \tau_i / N),$$

where N is a Fast Fourier Transform (FFT) point number corresponding to the system. If a frequency label set of scattered pilots is $S_{sp} = \{p | p = p_0 + l\Delta\}$, where $p_0$ is a position label of the first scattered pilot, $\Delta$ is an interval between neighboring pilot frequencies, and l is a serial number of a pilot, then a response at the pilot is:

$$H_p = \sum_i a_i \cdot \exp(-j2\pi p \tau_i / N) = \sum_i a_i \cdot \exp(-j2\pi (p_0 + l\Delta) \tau_i / N)$$

Figure 1:
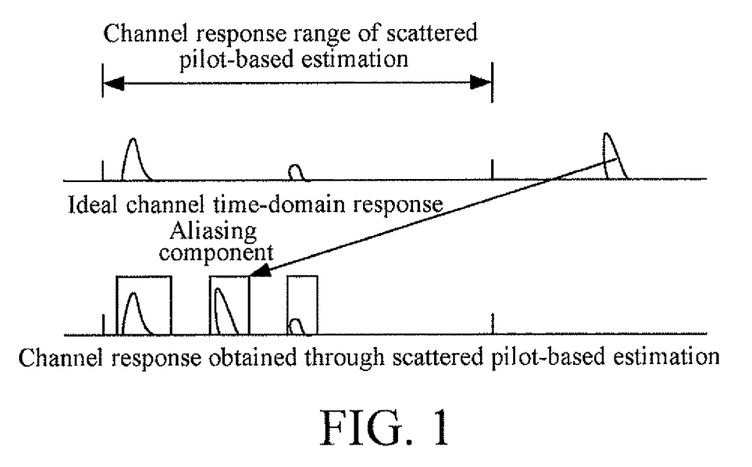
FIG. 1 is a schematic view of a time-domain response corresponding to channel estimation based on scattered pilots in the prior art.

Without loss of generality, if $p_0=0$, $$H_p(l) = H_p = \sum_i a_i \cdot \exp(-j2\pi l\Delta \tau_i / N) = \sum_i a_i \cdot \exp(-j2\pi l \tau_i / (N_p))$$

where, $N_p = N/\Delta$. It can be seen from the above equations that, if an ultra-long path satisfying $\tau_i = N_p + \tau_i'$, $\tau_i' > 0$ exists, channel estimation using scattered pilots becomes fuzzy, as $\tau_i$ and $\tau_i'$ in the above equations are corresponding to the same result. That is to say, in this mode of channel estimation using scattered pilots, the estimation range does not exceed $N_p$. As shown in FIG. 1, once the multi-path signal received by the receiving end includes a signal from an ultra-long path, aliasing components may exist in the frequency-domain response of the channel during channel estimation using scattered pilots, resulting in fuzzy channel estimation. In this case, the method that performs channel estimation only according to scattered pilots fails.

Therefore, it is necessary to improve the existing method for channel estimation based on scattered pilots.

SUMMARY OF THE PRESENT INVENTION

An object of the present invention is to provide a method and system for channel estimation.

In order to accomplish the above and other objects, the method for channel estimation provided in the present invention comprises steps of: 1) extracting pilot signals from a received multi-path signal, wherein each pilot signal comprises a first pilot and a second pilot; 2) obtaining an initially estimated channel frequency-domain response based on an estimated delay of each pilot signal and the extracted first pilot; 3) calculating a frequency-domain response estimate of each pilot frequency in the second pilot according to the obtained initially estimated channel frequency-domain response, obtaining an actual value of each pilot frequency in the second pilot based on the extracted second pilot, and calculating a deviation between the frequency-domain response estimate and the actual value of each pilot frequency; 4) detecting whether an aliasing component exists in the initially estimated channel frequency-domain response; 5) if aliasing components exist, determining a position of each aliasing component according to the deviation of each pilot frequency in the second pilot; and 6) correcting the initially estimated channel frequency-domain response according to the determined positions of the aliasing components, so as to obtain final channel frequency-domain estimation.

In addition, the system for channel estimation consistent with the present invention comprises: an extraction module, for extracting pilot signals from a received multi-path signal, wherein each pilot signal comprises a first pilot and a second pilot; a channel frequency-domain response estimation module, for obtaining an initially estimated channel frequency-domain response based on an estimated delay of each pilot signal and the extracted first pilot; a deviation estimation module, for calculating a frequency-domain response estimate of each pilot frequency in the second pilot according to the obtained initially estimated channel frequency-domain response, obtaining an actual value of each pilot frequency in the second pilot based on the extracted second pilot, and calculating a deviation between the frequency-domain response estimate and the actual value of each pilot frequency; a detection module, for detecting whether an aliasing component exists in the initially estimated channel frequency-domain response; a positioning module, for determining a position of each aliasing component according to the deviation of each pilot frequency in the second pilot after the detection module determines that aliasing components exist; and a correction module, for correcting the initially estimated channel frequency-domain response according to the determined positions of the aliasing components, so as to obtain final channel frequency-domain estimation.

In summary, the method and system for channel estimation consistent with the present invention has an advantage of being capable of detecting an ultra-long transmission path, so as to avoid aliasing interference caused by signals transmitted through the ultra-long transmission path, thereby achieving better performance.

DETAILED DESCRIPTION OF THE PREFERRED EMBODIMENTS

The method for channel estimation consistent with the present invention is further explained in detail according to the accompanying drawings. The method consistent with the present invention is mainly applied to a communication system having a first pilot and a second pilot, for example, a system using OFDM transmission techniques, specifically, a system supporting Digital Video Broadcasting-Terrestrial (DVB-T) or China Mobile Multimedia Broadcasting (CMMB). The first pilot is generally a scattered pilot, and the second pilot may be continuous pilots, system transmission information such as transmission parameter signaling (TPS), or a combination thereof.

First Embodiment

Figure 2:
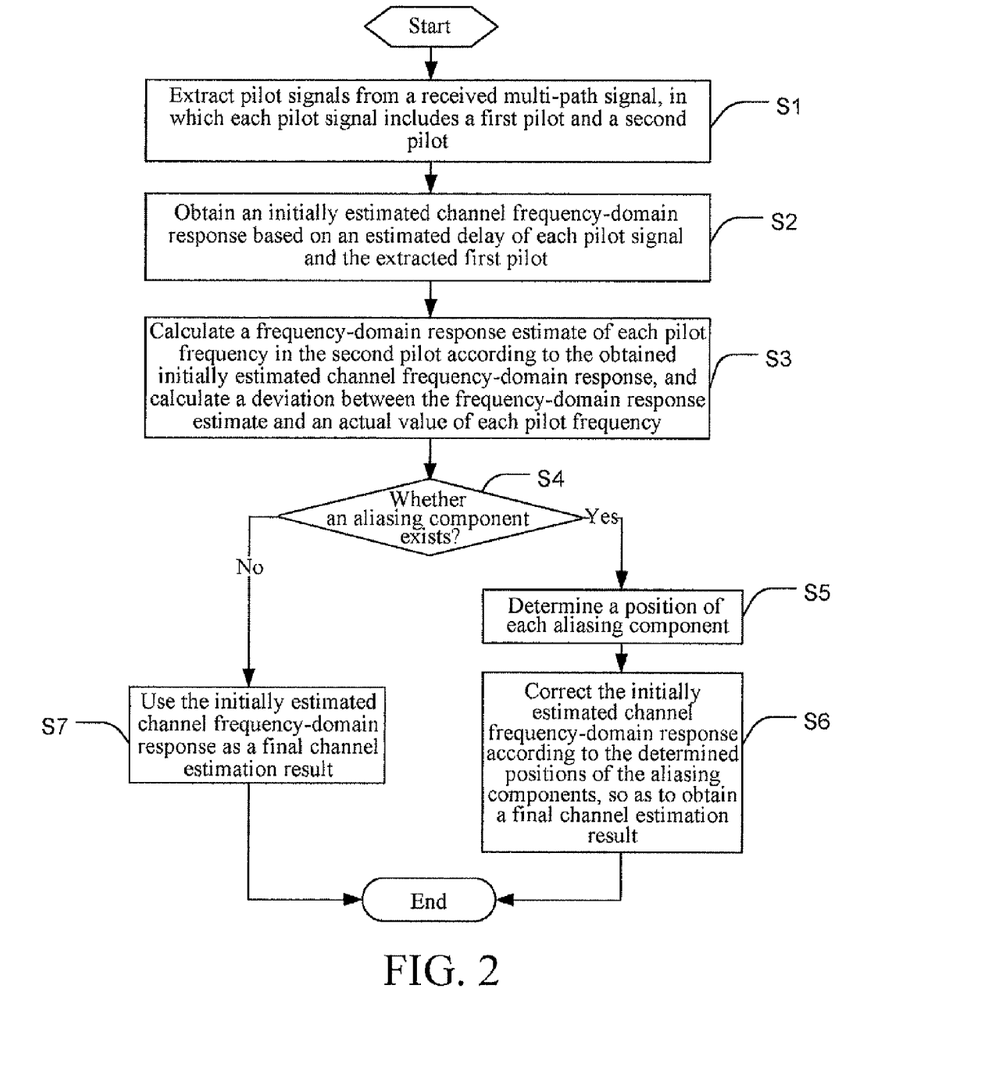
FIG. 2 is a flow chart of a method for channel estimation according to the first embodiment of the present invention.

Referring to FIG. 2, first, in Step S1, after receiving a multi-path signal, a receiving end extracts pilot signals from the multi-path signal, in which each pilot signal includes a first pilot and a second pilot. Generally, the receiving end may extract pilot signals from the multi-path signal by using taps. The receiving end includes, but not limited to, a mobile station and a base station.

Figure 3:
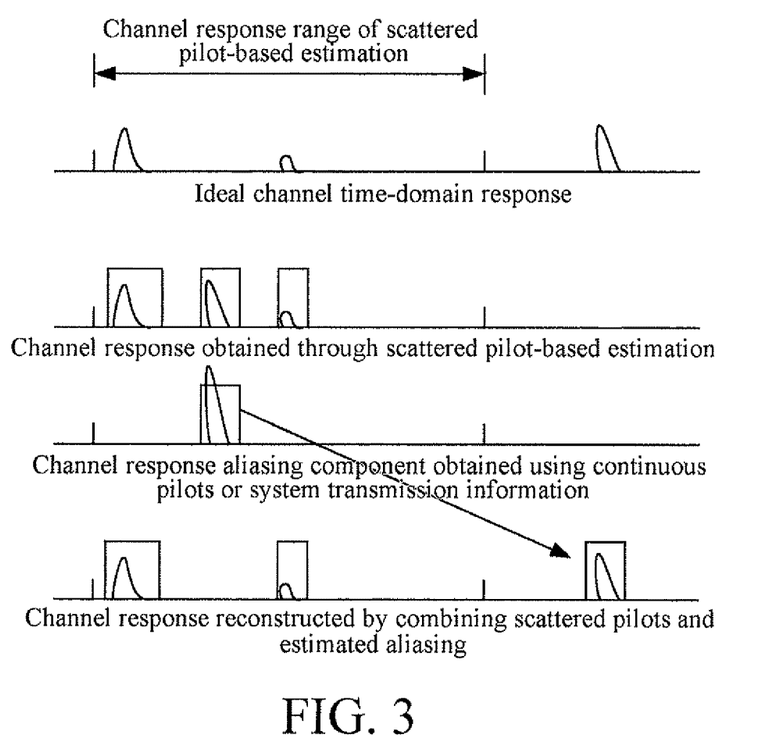
FIG. 3 is a schematic view of the estimation principle of a method for channel estimation consistent with the present invention.

Then, in Step S2, the receiving end obtains an initially estimated channel frequency-domain response based on an estimated delay of each pilot signal and the extracted first pilot. For example, the receiver estimates that the first signal transmitted through the first transmission path has a delay of $\tau_1, \ldots$, and the signal transmitted through the $i^{th}$ transmission path has a delay of $\tau_i$. Based on the estimated delays, the receiver may perform a frequency-domain transform such as discrete Fourier transform (that is, FFT) on the first pilot to obtain an initially estimated channel frequency-domain response, which is, for example, $$\hat{H}_k = \sum_i \hat{a}_i \cdot \exp(-j2\pi k \hat{\tau}_i / N) + I + n',$$

where $\hat{\tau}_i = \mathrm{mod}(\tau_i, N_p)$, N is an FFT point number used, $\tau_i$ is an estimated delay of the $i^{th}$ transmission path, $\hat{a}_i = a_i + n_i$ is an estimated tap response, $n_i$ is noise, I is the sum of all undetected tap responses, and n' is additive noise. As the range that can be estimated according to the first pilot is $N_p$ ($N_p = N/\Delta$), aliasing occurs when the receiving end performs frequency-domain estimation based on the pilot from an ultra-long path, as shown in FIG. 3. Techniques for estimating a channel frequency-domain response according to the first pilot, such as an interpolation method and a transform domain method, are well known to those with ordinary skill in the art, so the details will not be described herein.

Then, in Step S3, the receiver calculates a frequency-domain response estimate of each pilot frequency in the second pilot according to the obtained initially estimated channel frequency-domain response, obtains an actual value of each pilot frequency in the second pilot based on the extracted second pilot, and calculates a deviation between the frequency-domain response estimate and the actual value of each pilot frequency. The step of obtaining the actual value of each pilot frequency in the second pilot based on the extracted second pilot refers to that the receiver transforms an impulse response obtained according to taps into a frequency domain, for example, through FFT, to obtain the actual value of each pilot frequency in the second pilot. For example, for a second pilot set: $S_p = \{l_t | l_t \in S_{cp} \cup S_{tps}, l_t \notin S_{sp}\}$, where $S_{sp}$, $S_{cp}$ and $S_{tps}$ are respectively a frequency set where the first pilot, continuous pilots and system transmission information of an OFDM symbol block are located, based on the initially estimated channel frequency-domain response, the frequency-domain response of each pilot frequency is:

$$\hat{H}_{l_t} = \sum_i \hat{a}_i \cdot \exp(-j2\pi l_t \hat{\tau}_i / N) + I + n'',$$

and the actual value of each pilot frequency is:

$$H_{l_t} = \sum_i a_i \cdot \exp(-j2\pi k \tau_i / N),$$

therefore the calculated deviation of each pilot frequency is expressed as:

$$\Delta_{l_t} = H_{l_t} - \hat{H}_{l_t} = \sum_{i:\tau_i > N_p} (\hat{a}_i - a_i \exp(-j2\pi l_t / \Delta)) \exp(-j2\pi l_t \hat{\tau}_i / N) + I' + n'''$$

$$= \sum_{i:\tau_i > N_p} (1 - \exp(-j2\pi l_t / \Delta)) \exp(-j2\pi l_t \hat{\tau}_i / N) + I' + I'' + n''',$$

where $N_p = N/\Delta$, $\Delta$ is an interval between neighboring pilot frequencies, N is an FFT point number used, $a_i$ is an obtained actual impulse response value of each pilot frequency in the second pilot of the $i^{th}$ transmission path, $\hat{a}_i = a_i + n_i$ is an estimated tap response, $n_i$ is noise, I the sum of all undetected tap responses, n', n" and n''' are additive noise, and I' and I" are respectively undetected tap errors corresponding to delays smaller than and greater than $N_p$, and may also be considered as additive noise. The energy of the noise is smaller than the valid signal energy, and only affects the precision during processing. It should be noted that, the second pilot set shown above includes continuous pilots and system transmission information. In fact, those with ordinary skill in the art should understand that the second pilot set is not limited thereto, but may, for example, include only continuous pilots or only system transmission information.

Then, in Step S4, the receiving end detects whether an aliasing component exists in the initially estimated channel frequency-domain response, by, but not limited to, the following methods.

First detection method: collecting statistics regarding feature values of the deviation of each pilot frequency, and comparing the statistical result with energy and noise variance of the frequency-domain response estimate of the second pilot, so as to detect whether an aliasing component exists in the initially estimated channel frequency-domain response. Here, statistics may be collected regarding feature values of the deviations of a part of pilot frequencies, or regarding feature values of the deviations of all pilot frequencies. Furthermore, the feature values include, but not limited to, norms. For example, the deviation of each pilot frequency is expressed as:

$$\Delta_{l_i} = \sum_{i: r_i > N_p} a_i(1 - \exp(-j2\pi l_t/\Delta))\exp(-j2\pi l_t \hat{\tau}_i/N) + I' + I'' + n''',$$

and the statistical result for a part of feature values is:

$$P = \sum_{l_r: \|\Delta_{l_i}\|^q > th \& l_r \in S_p} \|\Delta_{l_i}\|^q,$$

where $\|\cdot\|^q$ is a q-order norm, and th is a threshold preset according to noise power and estimation precision. By comparing the result with the energy and noise variance of the frequency-domain response estimate of the second pilot, that is, $h_{exist} = f(\hat{H}_{l_t}, \sigma)$, it may be judged whether an aliasing component exists. Here, $h_{exist} = f(\hat{H}_{l_t}, \sigma)$ may adopt different combinations, for example, $f(\hat{H}_{l_t}, \sigma) = \lambda_1 g(\hat{H}_{l_t}) + \lambda_2 \sigma^2$, or $f(\hat{H}_{l_t}, \sigma) = \max(\lambda_1 g(\hat{H}_{l_t}) + \lambda_2 \sigma^2)$, where $\lambda_1$ and $\lambda_2$ are constants, and $g(\bullet)$ is a function for extracting channel response characteristics such as a sum of channel energy or a maximum energy value of a single path.

Second detection method: dividing the deviations of the pilot frequencies into an odd number group and an even number group based on serial numbers $l_t$ of the pilot frequencies, collecting statistics regarding feature values (for example, norms) of the odd number group and the even number group, and comparing the feature values of the odd number group and the even number group, so as to detect whether an aliasing component exists in the initially estimated channel frequency-domain response. Under some pilot distributions, the deviation does not contain aliasing information if $l_t$ is an even number, so that by grouping the deviations into two subsets according to whether the subscripts are odd or even numbers, whether aliasing exists may also be judged by comparison after statistics regarding feature values of the components in the two subsets are collected.

Then, in Step S5, if the detection result indicates that aliasing components exist, positions of the aliasing components are determined according to the deviations. Specifically, the aliasing components may be considered as a cluster, in which case a cluster center of the cluster may be determined according to the deviation of each pilot frequency. The deviation of each pilot frequency is:

$$\Delta_{l_i} = \sum_{i: r_i > N_p} a_i(1 - \exp(-j2\pi l_t/\Delta))\exp(-j2\pi l_t \hat{\tau}_i/N) + I' + I'' + n''',$$

which may be modified into:

$$\Delta_{l_i} = \left(\sum_{i: r_i > N_p} a_i(1 - \exp(-j2\pi l_t/\Delta))\exp(-j2\pi l_t \hat{\tau}_i'/N)\right)\exp(j2\pi l_t \hat{\tau}_0/N) + I_{total},$$

where $\hat{\tau}_i' = \hat{\tau}_i + \hat{\tau}_0$, and $I_{total}$ includes undetected tap errors and additive noise. Accordingly, the estimated cluster center is:

$$\hat{\tau}_0 = \frac{1}{|S_p^{odd}| - 1} \sum_{l_i: l_i \in S_p^{odd}} \arg(\Delta_{l_i} \cdot \Delta_{l_{i+1}}) \cdot N/(l_{i+1} - l_i)/2/\pi,$$

where arg(.) is an operation of extracting a phase, |•| represents the number of elements in a set, and $S_p^{odd}$ is a subset formed by elements with odd-numbered subscripts in $S_p$. Then, after a central delay is removed, it can be obtained that the aliasing delay is limited in $\lfloor -\text{floor}(S_p^{odd}/2), \text{floor}(S_p^{odd}/2) \rfloor$, where floor( ) is a rounding down operation. Afterward, the aliasing components may be estimated by using a conjugate gradient-like algorithm. In this embodiment, as shown in FIG. 3, the position of an aliasing component can be obtained through the above process.

Figure 4:
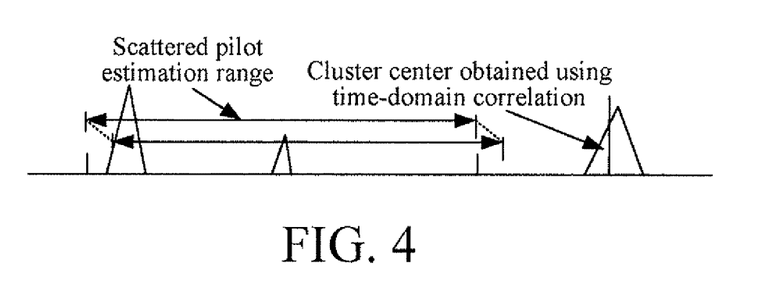
FIG. 4 is a schematic view of a cluster center estimated using time-domain correlation in a method for channel estimation consistent with the present invention.

Moreover, the step of determining the cluster center is performed in a frequency domain. In fact, those with ordinary skill in the art should understand that the cluster center may also be obtained through processing in a time domain, for example, for a frame structure containing cyclic prefixes, statistics regarding a constant-length correlation sum are collected through cyclic correlation, it is determined whether the received multi-path signal includes a signal from an ultra-long path according to a corresponding magnitude, and the center of the signal from the ultra-long path is determined, as shown in FIG. 4. When it is detected that a valid component beyond the range $N_p$ exists within one OFDM symbol, the obtained center may be considered as the cluster center.

Then, in Step S6, the receiver corrects the initially estimated channel frequency-domain response according to the determined positions of the aliasing components. For example, through the above process, the obtained aliasing components are $\{(\hat{\tau}_0, \hat{a}_0), (\hat{\tau}_1, \hat{a}_1), \ldots (\hat{\tau}_{al}, \hat{a}_{al})\}$, and correspondingly, the corrected channel frequency-domain estimation is:

$$\tilde{H}_k = \sum_i \tilde{a}_i \cdot \exp(-j2\pi k \tilde{\tau}_i/N).$$

If $(\tilde{\tau}_i \leq N_p) \cap ((\tilde{\tau}_i + N_p) = \hat{\tau}_j \in \{\hat{\tau}_0, \hat{\tau}_1, \ldots, \hat{\tau}_{al}\})$, then:

$\tilde{a}_i = \hat{a}_i - \hat{a}_j$

If $(\tilde{\tau}_i \leq N_p) \cap ((\tilde{\tau}_i + N_p) \notin \{\hat{\tau}_0, \hat{\tau}_1, \ldots, \hat{\tau}_{ai}\})$, then:

$\tilde{a}_i = \hat{a}_i$

If $(\tilde{\tau}_i > N_p) \cap (\tilde{\tau}_i = \hat{\tau}_j \in \{\hat{\tau}_0, \hat{\tau}_1, \ldots, \hat{\tau}_{ai}\})$, then:

$\tilde{a}_i = \hat{a}_j$

As can be seen from FIG. 3, aliasing is eliminated in the channel frequency-domain response obtained after the above correction.

Finally, in Step S7, if no aliasing component exists in the initially estimated channel frequency-domain response, the initially estimated channel frequency-domain response is directly used as a final channel estimation result.

Second Embodiment

Figure 5:
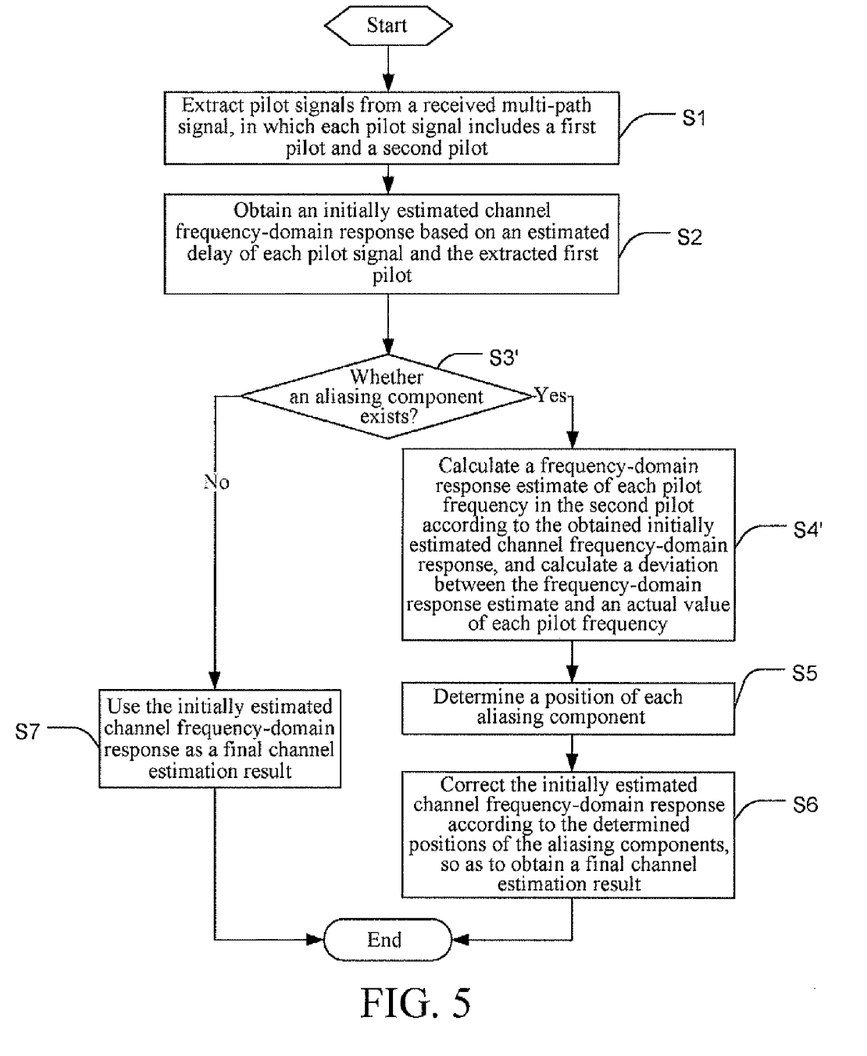
FIG. 5 is a flow chart of a method for channel estimation according to the second embodiment of the present invention.

Referring to FIG. 5, the difference between this embodiment and the first embodiment lies in the order of the steps. That is, after Steps S1 and S2 are performed, in Step S3', the receiving end detects whether an aliasing component exists in the initially estimated channel frequency-domain response. In this embodiment, the receiver may adopt the third detection method described above for detection. Then, in Step S4', if the detection result indicates that aliasing components exist, the receiver calculates a frequency-domain response estimate of each pilot frequency in the second pilot according to the obtained initially estimated channel frequency-domain response, obtains an actual value of each pilot frequency in the second pilot based on the extracted second pilot, and calculates a deviation between the frequency-domain response estimate and the actual value of each pilot frequency. Afterward, Steps S5 to S7 are performed, which are the same as those described in the first embodiment, so the details will not be described herein again.

Figure 6:
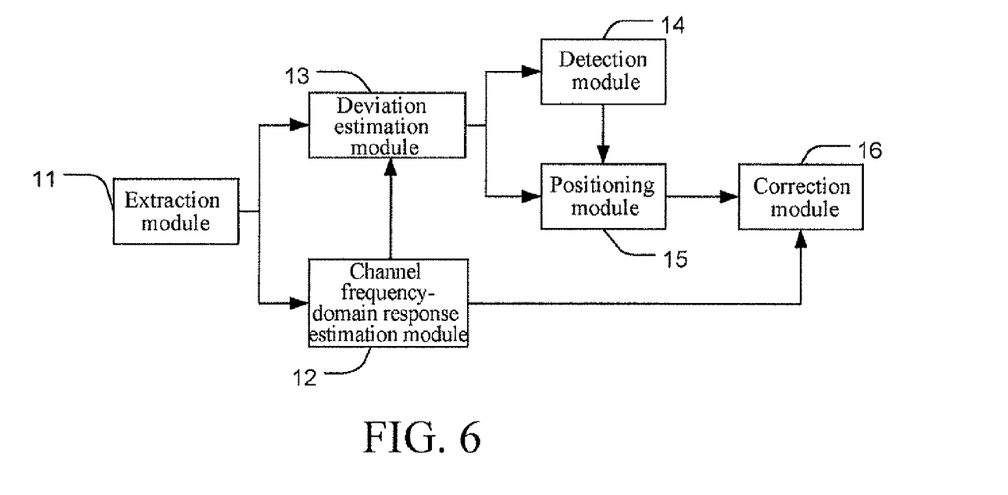
FIG. 6 is a schematic structural view of a system for channel estimation consistent with the present invention.

FIG. 6 is a schematic structural view of a system for channel estimation consistent with the present invention. The system for channel estimation includes an extraction module 11, a channel frequency-domain response estimation module 12, a deviation estimation module 13, a detection module 14, a positioning module 15, and a correction module 16. The system for channel estimation may be disposed in a receiver. The receiver may transmit and receive signals using OFDM transmission techniques, and includes, but not limited to, a mobile station and a base station.

The extraction module 11 extracts pilot signals from the multi-path signal, in which each pilot signal includes a first pilot and a second pilot. Generally, the extraction module may extract pilot signals from the multi-path signal by using taps. The first pilot is generally a scattered pilot, and the second pilot may be continuous pilots, system transmission information such as TPS, or a combination thereof.

The channel frequency-domain response estimation module 12 is used for obtaining an initially estimated channel frequency-domain response based on an estimated delay of each pilot signal and the extracted first pilot. For example, the channel frequency-domain response estimation module 12 estimates that the first signal transmitted through the first transmission path has a delay of $\tau_1$, . . . , and the signal transmitted through the $i^{th}$ transmission path has a delay of $\tau_i$. As such, the obtained initially estimated channel frequency-domain response is:

$$\hat{H}_k = \sum_i \hat{a}_i \cdot \exp(-j2\pi k\hat{\tau}_i/N) + I + n',$$

where $\hat{\tau}_i = \mathrm{mod}(\tau_i, N_p)$, N is an FFT point number used, $\tau_i$ is an estimated delay of the $i^{th}$ transmission path, $\hat{a}_i = a_i + n_i$ is an estimated tap response, $n_i$ is noise, I is the sum of all undetected tap responses, and n' is additive noise. As the range that can be estimated according to the first pilot is $N_p$ ($N_p = N/\Delta$), aliasing occurs when the channel frequency-domain response estimation module 12 performs frequency-domain estimation based on the pilot from an ultra-long path, as shown in FIG. 3. Techniques for estimating a channel frequency-domain main response according to the first pilot, such as an interpolation method and a transform domain method, are well known to those with ordinary skill in the art, so the details will not be described herein.

The deviation estimation module 13 is used for calculating a frequency-domain response estimate of each pilot frequency in the second pilot according to the obtained initially estimated channel frequency-domain response, obtaining an actual value of each pilot frequency in the second pilot based on the extracted second pilot, and calculating a deviation between the frequency-domain response estimate and the actual value of each pilot frequency. For example, the step of obtaining the actual value of each pilot frequency in the second pilot based on the extracted second pilot refers to that the deviation estimation module 13 transforms an impulse response obtained according to taps into a frequency domain, for example, through FFT, to obtain the actual value of each pilot frequency in the second pilot, so that a deviation between the frequency-domain response estimate of the second pilot and the actual frequency-domain response may be obtained. For example, for pilot frequencies in a second pilot set $S_p = \{l_t | l_t \in S_{cp} \cup S_{tps}, l_t \notin S_{sp}\}$, the frequency-domain response of each pilot frequency estimated by the deviation estimation module 13 is:

$$\hat{H}_{l_t} = \sum_i \hat{a}_i \cdot \exp(-j2\pi l_t \hat{\tau}_i / N) + I + n'',$$

and the actual frequency-domain response of each pilot frequency is:

$$H_{l_t} = \sum_i a_i \cdot \exp(-j2\pi k \tau_i / N),$$

therefore, the deviation of each pilot frequency calculated by the deviation estimation module 13 is expressed as:

$$\Delta_{l_t} =$$

$$H_{l_t} - \hat{H}_{l_t} = \sum_{i:\tau_i > N_p} (\hat{a}_i - a_i \exp(-j2\pi l_t / \Delta)) \exp(-j2\pi l_t \hat{\tau}_i / N) + I' + n''' =$$

$$\sum_{i:\tau_i > N_p} a_i (1 - \exp(-j2\pi l_t / \Delta)) \exp(-j2\pi l_t \hat{\tau}_i / N) + I' + I'' + n''',$$

where $N_p = N/\Delta$, $\Delta$ is an interval between neighboring pilot frequencies, N is an FFT point number used, $a_i$ is an obtained actual impulse response value of a pilot frequency of the $i^{th}$ transmission path, n', n'' and n''' are additive noise, and I' and I'' are respectively undetected tap errors corresponding to delays smaller than and greater than $N_p$, and may also be considered as additive noise. The energy of the noise is smaller than the valid signal energy, and only affects the precision during processing.

The detection module 14 detects whether an aliasing component exists in the initially estimated channel frequency-domain response.

As a preferred implementation, the detection module 14 may include a statistics unit (not shown), a first calculation unit (not shown) and a first comparison unit (not shown). The statistics unit is used for collecting statistics regarding feature values of the deviation of each pilot frequency; the first calculation unit is used for calculating energy and noise variance of the frequency-domain response estimate of the second pilot; and the first comparison unit is used for comparing the statistical result of the statistics unit with the calculation result of the first calculation unit, so as to detect whether an aliasing component exists in the initially estimated channel frequency-domain response. The statistics unit may collect statistics regarding feature values of the deviations of a part of pilot frequencies, or regarding feature values of the deviations of all pilot frequencies. Furthermore, the feature values include, but not limited to, norms. For example, the deviation of each pilot frequency is expressed as:

$$\Delta_{l_t} = \sum_{i:\tau_i > N_p} a_i(1 - \exp(-j2\pi l_t/\Delta))\exp(-j2\pi l_t \hat{\tau}_i/N) + I' + I'' + n''',$$

and the statistical result of the statistics unit for a part of feature values is:

$$P = \sum_{l_t: \|\Delta_{l_t}\|^q > th \& l_t \in S_p} \|\Delta_{l_t}\|^q,$$

where $\|\cdot\|^q$ is a q-order norm, and th is a threshold preset according to noise power and estimation precision. The first calculation unit calculates the energy and noise variance of the frequency-domain response estimate of the second pilot, which is, for example, $h_{exist} = f(\hat{H}_{l_t}, \sigma)$, and then the first comparison unit compares the statistical result $$P = \sum_{l_t: \|\Delta_{l_t}\|^q > th \& l_t \in S_p} \|\Delta_{l_t}\|^q,$$

with $h_{exist} = f(\hat{H}_{l_t}, \sigma)$, so as to judge whether an aliasing component exists. Here, $h_{exist} = f(\hat{H}_{l_t}, \sigma)$ may adopt different combinations, for example, $f(\hat{H}_{l_t}, \sigma) = \lambda_1 g(\hat{H}_{l_t}) + \lambda_2 \sigma^2$, or $f(\hat{H}_{l_t}, \sigma) = \max(\lambda_1 g(\hat{H}_{l_t}) + \lambda_2 \sigma^2)$, where $\lambda_1$ and $\lambda_2$ are constants, and $g(\cdot)$ is a function for extracting channel response characteristics such as a sum of channel energy or a maximum energy value of a single path.

As another preferred implementation, the detection module may include a grouping unit (not shown), a second calculation unit (not shown) and a second comparison unit (not shown). The grouping unit divides the deviations of the pilot frequencies into an odd number group and an even number group based on serial numbers $l_t$ of the pilot frequencies; the second calculation unit collects statistics regarding feature values (for example, norms) of the odd number group and the even number group; and the second comparison unit compares the feature values of the odd number group and the even number group, so as to detect whether an aliasing component exists in the initially estimated channel frequency-domain response. Under some pilot distributions, the deviation does not contain aliasing information if $l_t$ is an even number, so that by grouping the deviations into two subsets according to whether the subscripts are odd or even numbers, whether aliasing exists may also be judged by comparison after statistics regarding feature values of the components in the two subsets are collected.

As another preferred implementation, the detection module may include a correlation detection unit (not shown). The correlation detection unit is used for detecting whether an aliasing component exists based on a time correlation of cyclic prefixes of signals in the received multi-path signal.

The positioning module 15 is used for determining positions of aliasing components according to the deviations after the detection module determines that the aliasing components exist. As a preferred implementation, the positioning module 15 may include a cluster center estimation unit (not shown) and a positioning unit (not shown). The cluster center estimation unit considers the aliasing components as a cluster, and determines a cluster center of the cluster according to the deviation of each pilot frequency. The deviation of each pilot frequency is:

$$\Delta_{l_t} = \sum_{i:\tau_i > N_p} a_i(1 - \exp(-j2\pi l_t/\Delta))\exp(-j2\pi l_t \hat{\tau}_i/N) + I' + I'' + n''',$$

which may be modified into:

$$\Delta_{l_t} = \left( \sum_{i:\tau_i > N_p} a_i(1 - \exp(-j2\pi l_t/\Delta))\exp(-j2\pi l_t \hat{\tau}'_i/N) \right) \exp(j2\pi l_t \hat{\tau}_0/N) + I_{total},$$

where $\tau_i' = \hat{\tau}_i + \hat{\tau}_0$, and $I_{total}$ includes undetected tap errors and additive noise. Accordingly, the cluster center estimated by the cluster center estimation unit is:

$$\hat{\tau}_0 = \frac{1}{|S_p^{odd}| - 1} \sum_{l_t: l_t \in S_p^{odd}} \arg(\Delta_{l_t} * \Delta_{l_{t+1}}) \cdot N/(l_{t+1} - l_t)/2/\pi,$$

where arg(.) is an operation of extracting a phase, |•| represents the number of elements in a set, and $S_p^{odd}$ is a subset formed by elements with odd-numbered subscripts in $S_p$. Then, after the positioning unit removes a central delay, it can be obtained that the aliasing delay is limited in $\lfloor -\text{floor}(S_p^{odd}/2), \text{floor}(S_p^{odd}/2) \rfloor$. The positioning unit estimates the aliasing components by using a conjugate gradient-like algorithm. In this embodiment, as shown in FIG. 3, the position of an aliasing component can be obtained through the above process.

Moreover, the step of estimating the cluster center by the cluster center estimation unit is performed in a frequency domain. In fact, those with ordinary skill in the art should understand that the cluster center may also be obtained through processing in a time domain, for example, for a frame structure containing cyclic prefixes, statistics regarding a constant-length correlation sum are collected through cyclic correlation, it is determined whether the received multi-path signal includes a signal from an ultra-long path according to a corresponding magnitude, and the center of the signal from the ultra-long path is determined, as shown in FIG. 4. When it is detected that a valid component beyond the range N, exists within one OFDM symbol, the obtained center may be considered as the cluster center.

The correction module 16 corrects the initially estimated channel frequency-domain response according to the determined positions of the aliasing components. For example, the aliasing components obtained by the positioning unit are $\{(\hat{\tau}_0, \hat{a}_0)(\hat{\tau}_1, \hat{a}_1)(\hat{\tau}_{al}, \hat{a}_{al})\}$, and correspondingly, the channel frequency-domain estimation after being corrected by the correction module 16 is:

$$\tilde{H}_k = \sum_i \tilde{a}_i \cdot \exp(-j2\pi k \tilde{\tau}_i / N).$$

If $(\tilde{\tau}_i \leq N_p) \cap ((\tilde{\tau}_i + N_p) = \hat{\tau}_j \in \{\hat{\tau}_0, \hat{\tau}_1, \ldots, \hat{\tau}_{al}\})$, then:

$\tilde{a}_i = \hat{a}_i - \hat{a}_j$

If $(\tilde{\tau}_i \leq N_p) \cap ((\tilde{\tau}_i + N_p) \notin \{\hat{\tau}_0, \hat{\tau}_1, \ldots \hat{\tau}_{al}\})$, then:

$\tilde{a}_i = \hat{a}_i$

If $(\tilde{\tau}_i > N_p) \cap (\tilde{\tau}_i = \hat{\tau}_j \in \{\hat{\tau}_0, \hat{\tau}_1, \ldots \hat{\tau}_{al}\})$, then:

$\tilde{a}_i = \hat{a}_j$

As can be seen from FIG. 3, aliasing is eliminated in the channel frequency-domain response after being corrected by the correction module 16.

If the detection result of the detection module 14 indicates that no aliasing component exists in the initially estimated channel frequency-domain response, the correction module 16 directly uses the initially estimated channel frequency-domain response as a final channel estimation result.

In summary, the method and system for channel estimation consistent with the present invention uses TPS or continuous pilots for ultra-long path detection, and uses the information to correct the transform-domain channel estimation result, so as to achieve higher accuracy.

The above description of the detailed embodiments are only to illustrate the preferred implementation according to the present invention, and it is not to limit the scope of the present invention, Accordingly, all modifications and variations completed by those with ordinary skill in the art should fall within the scope of the present invention defined by the appended claims.

What is claimed is:

1. A method for channel estimation, performed by a communication system having a first pilot and a second pilot, the method for channel estimation comprising steps of:
    extracting pilot signals from a received multi-path signal, wherein each pilot signal comprises the first pilot and the second pilot;
    obtaining an initially estimated channel frequency-domain response based on an estimated delay of each pilot signal and the extracted first pilot;
    calculating a frequency-domain response estimate of each pilot frequency in the second pilot according to the obtained initially estimated channel frequency-domain response, obtaining an actual value of each pilot frequency in the second pilot based on the extracted second pilot, and calculating a deviation between the frequency-domain response estimate and the actual value of each pilot frequency;
    detecting whether an aliasing component exists in the initially estimated channel frequency-domain response;
    if aliasing components exist, determining a position of each aliasing component according to the deviation of each pilot frequency in the second pilot; and
    correcting the initially estimated channel frequency-domain response according to the determined positions of the aliasing components, so as to obtain final channel frequency-domain estimation.

2. The method for channel estimation as in claim 1, wherein an N-point discrete Fourier transform is performed based on the estimated delay of each pilot signal and the extracted first pilot to obtain the initially estimated channel frequency-domain response, wherein N is preset.

3. The method for channel estimation as in claim 1, wherein the step of detecting whether an aliasing component exists in the initially estimated channel frequency-domain response comprises: 1) collecting statistics regarding feature values of the deviation of each pilot frequency; 2) calculating energy and noise variance of the frequency-domain response estimate of each pilot frequency; and 3) comparing the statistical result with the calculated energy and noise variance, so as to detect whether an aliasing component exists.

4. The method for channel estimation as in claim 3, wherein statistics regarding a norm of the deviation of each pilot frequency are collected.

5. The method for channel estimation as in claim 3, wherein statistics regarding feature values of the deviations of all pilot frequencies in the second pilot are collected.

6. The method for channel estimation as in claim 3, wherein statistics regarding feature values of the deviations of a part of pilot frequencies in the second pilot are collected.

7. The method for channel estimation as in claim 1, wherein the step of detecting whether an aliasing component exists in the initially estimated channel frequency-domain response comprises: 1) dividing the deviations of the pilot frequencies into an odd number group and an even number group based on serial numbers of the pilot frequencies; and 2) collecting statistics regarding feature values of the odd number group and the even number group, and comparing the feature values of the odd number group and the even number group, so as to detect whether an aliasing component exists.

8. The method for channel estimation as in claim 1, wherein whether an aliasing component exists is detected based on a time correlation of cyclic prefixes of signals in the received multi-path signal.

9. The method for channel estimation as in claim 1, wherein the step of determining the position of each aliasing component comprises:
    1) estimating a cluster center of a cluster formed by the aliasing components according to the deviation of each pilot frequency; and 2) estimating the position of each aliasing component by using a conjugate gradient-like algorithm based on the cluster center.

10. The method for channel estimation as in claim 9, wherein when the deviation of each pilot frequency is expressed as:

$$\Delta_{l_t} = \sum_{i:\tau_i > N_p} a_i(1 - \exp(-j2\pi l_t/\Delta))\exp(-j2\pi l_t \hat{\tau}_i/N) + I_{total},$$

the estimated cluster center is:

$$\tilde{\tau}_0 = \frac{1}{|S_p^{odd}| - 1} \sum_{l_t: l_t \in S_p^{odd}} \arg(\Delta_{l_t} * \Delta_{l_{t+1}}) \cdot N/(l_{t+1} - l_t)/2/\pi,$$

wherein arg(.) is an operation of extracting a phase, |•| represents the number of elements in a set, a pilot set of the second pilot is $S_p$, $l_t$ is an element in $S_p$, $S_p^{odd}$ is a subset formed by elements with odd-numbered subscripts in $S_p$, $\hat{\tau}_i' = \tilde{\tau}_i + \tilde{\tau}_0$, $\tilde{\tau}_i = \mod(\tau_i, N_p)$, $\tau_i$ is an estimated delay of the $i^{th}$ transmission path, $a_i$ is an obtained actual impulse response value of each pilot frequency in the second pilot of the i$^{th}$ transmission path, $\Delta$ is an interval between neighboring pilot frequencies, $I_{total}$ comprises errors and noise not extracted, $N_p=N/\Delta$, and N is a Fast Fourier Transform (FFT) point number used.

11. The method for channel estimation as in claim 1, wherein the second pilot comprises continuous pilots and system transmission information.

12. A system for channel estimation, applied to a communication system having a first pilot and a second pilot, the system for channel estimation comprising:
- an extraction module, for extracting pilot signals from a received multi-path signal, wherein each pilot signal comprises the first pilot and the second pilot;
- a channel frequency-domain response estimation module, for obtaining an initially estimated channel frequency-domain response based on an estimated delay of each pilot signal and the extracted first pilot;
- a deviation estimation module, for calculating a frequency-domain response estimate of each pilot frequency in the second pilot according to the obtained initially estimated channel frequency-domain response, obtaining an actual value of each pilot frequency in the second pilot based on the extracted second pilot, and calculating a deviation between the frequency-domain response estimate and the actual value of each pilot frequency;
- a detection module, for detecting whether an aliasing component exists in the initially estimated channel frequency-domain response;
- a positioning module, for determining a position of each aliasing component according to the deviation of each pilot frequency in the second pilot after the detection module determines that aliasing components exist; and
- a correction module, for correcting the initially estimated channel frequency-domain response according to the determined positions of the aliasing components, so as to obtain final channel frequency-domain estimation.

13. The system for channel estimation as in claim 12, wherein the channel frequency-domain response estimation module is a module capable of performing an N-point discrete Fourier transform, for performing an N-point discrete Fourier transform based on the estimated delay of each pilot signal and the extracted first pilot to obtain the initially estimated channel frequency-domain response, wherein N is preset.

14. The system for channel estimation as in claim 12, wherein the detection module comprises: a statistics unit, for collecting statistics regarding feature values of the deviation of each pilot frequency; a first calculation unit, for calculating energy and noise variance of the frequency-domain response estimate of each pilot frequency; and a first comparison unit, for comparing the statistical result with the calculation result of the first calculation unit, so as to detect whether an aliasing component exists.

15. The system for channel estimation as in claim 14, wherein the statistics unit collects statistics regarding a norm of the deviation of each pilot frequency.

16. The system for channel estimation as in claim 14, wherein the statistics unit collects statistics regarding feature values of the deviations of a part of pilot frequencies in the second pilot.

17. The system for channel estimation as in claim 14, wherein the statistics unit collects statistics regarding feature values of the deviations of all pilot frequencies in the second pilot.

18. The system for channel estimation as in claim 12, wherein the detection module comprises: a grouping unit, for dividing the deviations of the pilot frequencies into an odd number group and an even number group based on serial numbers of the pilot frequencies; a second calculation unit, for collecting statistics regarding feature values of the odd number group and the even number group; and a second comparison unit, for comparing the calculated feature values of the odd number group and the even number group, so as to detect whether an aliasing component exists.

19. The system for channel estimation as in claim 12, wherein the detection module comprises: a correlation detection unit, for detecting whether an aliasing component exists based on a time correlation of cyclic prefixes of signals in the received multi-path signal.

20. The system for channel estimation as in claim 12, wherein the positioning module comprises: a cluster center estimation unit, for estimating a cluster center of a cluster formed by the aliasing components according to the deviation of each pilot frequency; and a positioning unit, for estimating the position of each aliasing component by using a conjugate gradient-like algorithm based on the cluster center.

21. The system for channel estimation as in claim 20, wherein when the deviation of each pilot frequency is expressed as:

$$\Delta_{l_t} = \sum_{i:\tau_i > N_p} \alpha_i(1 - \exp(-j2\pi l_t/\Delta))\exp(-j2\pi l_t \hat{\tau}_i/N) + I_{total},$$

the estimated cluster center is:

$$\hat{\tau}_0 = \frac{1}{|S_p^{odd}|-1} \sum_{l_t:l_t \in S_p^{odd}} \arg(\Delta_{l_t}^* \Delta_{l_{t+1}}) \cdot N/(l_{t+1}-l_t)/2/\pi,$$

wherein arg(.) is an operation of extracting a phase, |•| represents the number of elements in a set, a pilot set of the second pilot is $S_p$, $l_t$ is an element in $S_p$, $S_p^{odd}$ is a subset formed by elements with odd-numbered subscripts in $S_p$, $\hat{\tau}_i' = \hat{\tau}_i + \hat{\tau}_0$, $\hat{\tau}_i = \mathrm{mod}(\tau_i, N_p)$, $\tau_i$ is an estimated delay of the i$^{th}$ transmission path, $a_i$ is an obtained actual impulse response value of each pilot frequency in the second pilot of the i$^{th}$ transmission path, $\Delta$ is an interval between neighboring pilot frequencies, $I_{total}$ comprises errors and noise not extracted, $N_p=N/\Delta$, and N is a Fast Fourier Transform (FFT) point number used.

22. The system for channel estimation as in claim 12, wherein the second pilot comprises continuous pilots and system transmission information.

* * * * *